Nov. 5, 1929.　　　F. A. BICKNELL　　　1,734,791
PUSH VALVE
Filed July 25, 1928
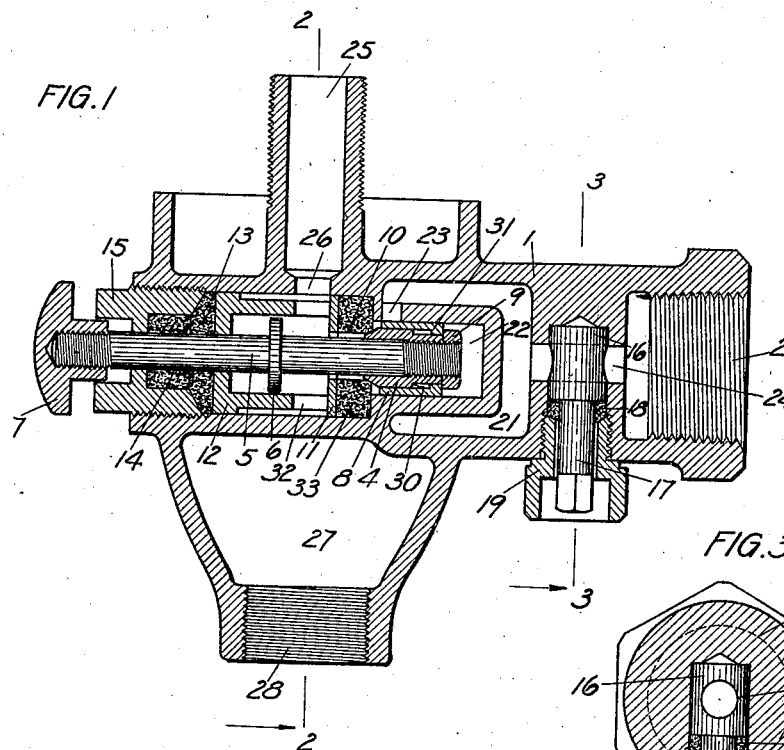
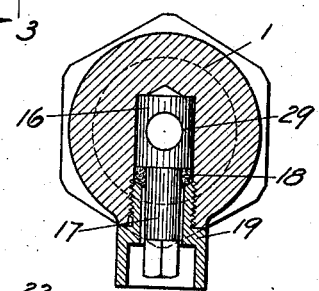
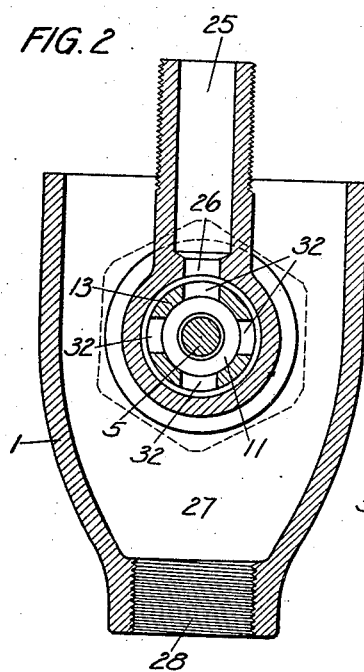
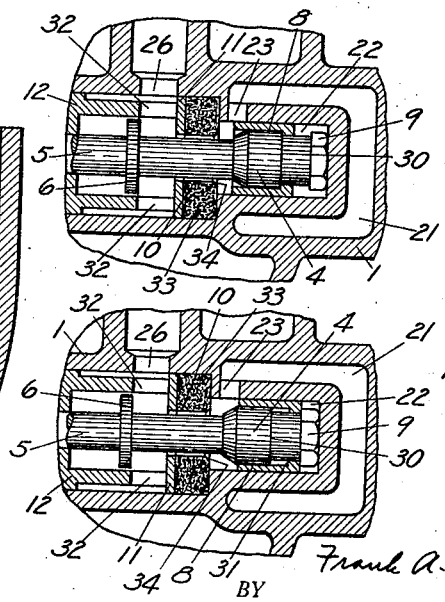
INVENTOR.
Frank A. Bicknell,
BY Frank A. Cutter,
ATTORNEY.

Patented Nov. 5, 1929

1,734,791

UNITED STATES PATENT OFFICE

FRANK A. BICKNELL, OF FLORENCE, MASSACHUSETTS, ASSIGNOR TO PURO SANITARY DRINKING FOUNTAIN COMPANY, A COPARTNERSHIP COMPOSED OF CHRISTIAN J. HILLS AND RUBEN B. HILLS, BOTH OF HAYDENVILLE, MASSACHUSETTS

PUSH VALVE

Application filed July 25, 1928. Serial No. 295,206.

My invention relates to improvements in valves used in connection with drinking fountains, basin faucets, bibs, and the like, wherein the valve members which control the flow of liquid through the valve casings are opened by pushing on the valve stems, which stems are usually equipped with push-buttons, the closing of said members being produced automatically or by the liquid itself, the latter always being under pressure.

In a structure of this type, the valve should open easily, gradually, and without the expenditure of an undue or uneven amount of force applied to the push-button, and said valve should also close gradually, evenly, and progressively, and there should be no shock or water-hammer during either operation, and the primary object of my invention is to produce such a structure which possesses the aforesaid desirable, not to say necessary, features or characteristics, and is free from the objections, just mentioned.

Another object is to produce a push valve which is simple both structurally and operatively, comprises comparatively few parts that can be easily and quickly assembled, is not liable to get out of order, and can be repacked and repaired without difficulty.

A further object is to provide the valve with regulating or reducing and shut-off means for the incoming liquid.

This push valve may be employed for the control of gas and air as well as liquid, provided the necessary pressure to close the valve be present.

Other objects and advantages will appear in the course of the following description.

I attain the objects and secure the advantages of my invention by the means and mechanism illustrated in the accompanying drawings, in which—

Figure 1 is a central, longitudinal section through a push valve which embodies a practical form of my invention; Fig. 2, a vertical section through said valve, taken on lines 2—2, looking in the direction of the associated arrow, in Fig. 1; Fig. 3, a cross section through said valve, taken on lines 3—3, looking in the direction of the associated arrow, in Fig. 1; Fig. 4, a sectional detail illustrating the operation of the valve, and, Fig. 5, another operative section detail.

Similar reference characters designate similar parts throughout the several views.

Although the particular form of push valve herein shown is more especially designed for a drinking fountain of the bubbler type, said valve is not limited in its application to drinking fountains of the bubbler or any other type, but has a very wide range of uses, as hereinbefore intimated.

The push valve comprises a casing 1, a main valve 4, a valve stem 5 provided with a closing collar or flange 6, a push-button 7, a sliding valve sleeve 8, a nut 9, a valve-seat member 10, a ring 11, a retainer 12, packings 13 and 14, and a retaining nut 15, and in addition, if desired, a regulating or reducing and shut-off valve 16 having a stem 17, packing 18, and a retaining nut 19.

Water enters the casing 1 at 20, and within said casing are outer and inner, horizontal chambers 21 and 22, respectively, said outer chamber opening into said inner chamber through a port 23, and said inner chamber being open at the end of said casing which is opposite to the inlet (20), a horizontal passage 24 connecting said inlet with said outer chamber at the outer end, a vertical discharge passage 25 open at the top and opening at the bottom into said inner chamber, as at 26, and an outer, vertical chamber 27 open at the top and having in the bottom an outlet 28, all of said chambers, passages, and openings being for the movement through them, either directly or indirectly, of the water under pressure entering at said inlet.

The inlet 20 is internally screw-threaded for attachment to a supply pipe (not shown), and the outlet 28 is internally screw-threaded for the attachment thereto of a waste pipe (not shown), it being through the chamber 27 and said outlet that the water passing upwardly through the passage 25, and not consumed, escapes as waste. Here the axial centers of the passage 25 and the outlet 28 are in line with each other. The wall of the passage 25 is externally screw-threaded to receive a bubbler (not shown).

The valve 16 is cylindrical and has a transverse passage 29 therethrough, and the casing 1 is bored vertically from below in a manner to locate the part of said valve in which is said passage across the passage 24, with the stem 17 down, and to receive the packing 18 around said stem and below said valve, and the upper portion of the retaining nut 19, such portion of said nut being tapped into the lower portion of said bore—see Figs. 1 and 3. The diameter of the passages 24 and 29 are of the same size.

When the valve 16 is disposed so that its passage 29 is directly in line with the passage 24, as shown in the drawings, said valve does not interfere with the flow of water through said second-named passage, and when said valve has imparted thereto one-quarter of a revolution, so that its passage is at right-angles to the other passage, the flow of water from the inlet 20 to the chamber 21 is entirely cut off. By turning the valve 16 partially to close the passage 24, the volume of water flowing through said passage is correspondingly reduced, the amount of reductions depending, of course, on the relative position of the passage 29 to said first-named passage. In this manner and by this means the flow of water is regulated to meet the requirements of the valve 4 and its mechanism.

The closing flange 6 is located on the valve stem 5 intermediate of the ends of said stem, and the end portions of said stem are screw-threaded to receive the valve 4 and the nut 9 which are screwed on to the inner or rear terminal and the push-button 7 which is screwed on to the outer or forward terminal of the stem. The nut 9 is behind the valve 4 and assists in holding said valve in place on the stem 5. The valve 4 is conical at the front end, and is reduced in diameter at the rear end to form an annular shoulder 30, and the valve sleeve 8 has at the rear end an interior flange to form a shoulder 31 behind said first-named shoulder and between the same and the outer rim portion of the nut 9. Thus the valve sleeve 8 has a certain amount of free or independent movement on the valve 4, but is mechanically and positively moved rearwardly, when the shoulder 30 encounters the shoulder 31, and forwardly, when the nut 9 encounters the back side of the flanged part of said sleeve. The valve-seat member 10 is preferably made of yielding material, while the ring 11 is made of metal. The member 10 encircles the stem 5 forward of the valve, and provides a seat, as indicated at 34, for the conical end of said valve, the diameter of the opening through said member or seat being greater than the diameter of said stem. There is an opening of similar size through the ring 11, which ring is in front of the member 10.

The retainer 12 is a hollow member open at the rear end and closed at the forward end except for a central passage through which the stem 5 extends and in which it has a sliding fit. Except at the forward end the retainer 12 is smaller in diameter than is the portion of the chamber 22 that is forward of the valve seat 34, and in which said retainer is located, and the lesser diametered part of said retainer is perforated at 32 to permit water to escape into said forward portion of said chamber, and thence through the opening 26. The sole purpose of the retainer 12 is to hold the member 10 and the ring 11 in place, as will presently appear. The flange 6 is within the retainer 12, but does not contact therewith. The retaining nut 15 is tapped into the end of the casing 1 opposite to that in which the inlet 20 is located, or into the open end of the chamber 22, and the packing 13 is between adjacent ends of said nut and the retainer 12, while the packing 14 is in a recessed part of said nut forward of said first-named packing, both packings embracing the valve stem 5. The outer part of the nut 15 may be recessed to receive or accommodate the hub of the push-button 7.

When the nut 15 is screwed tightly into the casing 1, said nut forces the packings 14 and 13 into snug engagement with the stem 5, crowds said packing 13 against the retainer 12, and forces the latter rearwardly against the ring 11 and said ring in turn against the valve-seat member 10, which member is thus held securely in place in the chamber 22, between an interior shoulder 33 in said chamber and said ring. The shoulder 33 is located in the chamber 22 between the port 23 and the opening 26, and the member 10, divides said chamber into front and rear portions into which said opening and port respectively open. The valve 4 and sleeve 8 are in the rear portion of the chamber 22, and the flange 6 in the front portion of said chamber.

In practice, the ring 11, the valve-seat member 10, the valve 4, with the valve sleeve 8 thereon, and the nut 9 are mounted on the stem 5 from the rear end, and said valve and nut are screwed into place, and the retainer 12, the packings 13 and 14, and nut 15, and the push-button 7 are mounted on said stem from the forward end, before any of these parts are introduced into the chamber 22 in the casing 1, and then they are introduced into said chamber through the front end thereof, and said nut 15 is screwed into place, when the parts and members occupy the positions shown in Fig. 1, allowing for movement of said stem and the elements mounted thereon to move therewith. Thus it is seen that the main valve and its associated parts and members form a unit which can be easily and quickly inserted in the valve casing and withdrawn therefrom, and readily taken apart and put together again for the purpose of removing or replacing worn or broken parts. This is an important advantage in a valve structure.

The longitudinal movement of the stem 5 is limited by the valve seat 34 and the valve 4, in a forward direction, and by the closed, inner or read end of the chamber 22, in the rearward direction.

Assuming that the valve 16 be at least partially open to permit water under pressure to flow through the passage 24, and that the seat 34 is closed by the valve 4, the complete operation of the push valve is described as follows:

The water which passes from the inlet 20 through the passage 24 fills the chamber 21, flows through the port 23 around the valve sleeve 8, which sleeve has a comparatively loose fit in the chamber 22, and fills said last-named chamber back of the member 10. This water being under pressure exerts sufficient force on the nut 9 and the rear end of the stem 5 and the sleeve 8 to retain the valve 4 tightly against the seat 34, consequently no water is permitted to flow through said seat and the ring 11 into the retainer 12 and the forward part of the chamber 22.

Upon applying pressure to the push-button 7 and forcing the stem 5 rearwardly or inwardly, the valve 4 is moved away from its seat, and water from the rear portion of the chamber 22 begins to flow through into the retainer 12, through the retainer perforations 32 into the forward portion of said chamber, and through the opening 26 into and through the passage 25. As the stem 5 continues to move rearwardly the shoulder 30 encounters the shoulder 31, when the sleeve 8 is moved rearwardly with the valve 4, and caused partially to uncover the port 23—see Fig. 4. The water now flows more freely through the port 23, the valve 4 is farther removed from its seat, and the increased flow of water passes through said seat and up into the passage 25. Finally, by the time the rear end of the stem 5 encounters the closed end of the chamber 22, and further rearward movement of said stem is prevented, the increased volume and force of the water passing through the port 23 acts on the sleeve 8 and forces the same rearwardly into contact with the nut 9—see Fig. 5. The valve is now wide open and the full volume of the water flowing upwardly through the passage 25.

Upon the release of the push-button 7 and the stem 5, the pressure of the water behind the flange 6 is sufficient to move said flange and with it said stem forwardly or outwardly until the valve 4 approaches and nearly closes its seat in the member 10. The stem 5 in moving forward takes with it the nut 9 and said nut positively actuates the sleeve 8 in the same direction until said sleeve covers the port 23. Still a small amount of water enters through said port into the chamber 22 around the sleeve 8 and the nut 9, more then escapes through the valve seat 34, and soon builds up or accumulates sufficient force to seat the valve 4 tightly and completely. The valve is now closed ready for a repetition of the opening and closing operations just described.

Thus it is seen that the force needed to open the valve 4 is approximately the same throughout the operation, and that the admission of water to the valve seat is so gradual and even no sudden shock or movement results or is produced by the water, while in closing the valve is held under control and checked, so that the closing movement is performed easily and noiselessly before the valve encounters its seat, or before it can be forced into contact with the same, and then the final closing movement is so slow and the amount of movement so slight that there is no possibility of producing shock or jar.

While the opening of the valve is mainly performed by hand, although the action in opening of the sleeve 8 is partially automatic, the closing of the valve is entirely automatic.

The rapid flow of water through the port 23, after the sleeve 8 has been moved into the position shown in Fig. 4, forces said sleeve back against the nut 9, so that said port is entirely uncovered practically as soon as the stem 5 reaches the extreme inner end of its travel.

The valve 16 is closed whenever it is desired to insert or remove the aforesaid unit in or from the chamber 22.

The outer portion of the retaining nut 19 may be recessed to receive and accommodate the head of the valve stem 17.

More or less change in the shape, size, construction, and arrangement of some or all of the parts of this push valve may be made, without departing from the spirit of my invention, or exceeding the scope of what is claimed.

I claim:

1. A push valve comprising a casing having therein outer and inner chambers communicating through a port, said outer chamber having an inlet and said inner chamber a discharge opening, a valve seat in said inner chamber between said port and said opening, a stem having a closing flange on one side and a valve on the other side of said seat, said stem extending through and of less diameter than the seat opening, and being adapted to be operated from outside of said casing, and a valve sleeve slidingly mounted on said valve in operative position relative to said port.

2. A push valve comprising a casing having therein outer and inner chambers communicating through a port, said outer chamber having an inlet and said inner chamber a discharge opening, a valve seat in said inner chamber between said port and said opening, a stem having a closing flange on one side and a valve on the other side of said seat, said stem extending through and of less diameter than the seat opening, and being adapted to be operated from outside of said casing, a valve sleeve slidingly mounted on said valve and adapted to be mechanically moved by movement of the valve partially to uncover said port and to be further moved by the flow through said port into position fully to uncover the port, and to be mechanically moved by movement of the valve in the other direction to cover the port.

3. A push valve comprising a casing having therein outer and inner chambers communicating through a port, said outer chamber having an inlet and said inner chamber a discharge opening, a valve seat in said inner chamber between said port and said opening, a stem extending through and smaller than the seat opening, adapted to be operated from outside of said casing, and having a closing flange on one side and a valve on the other side of said seat, a valve sleeve slidingly mounted on said valve adjacent to said port, mechanical means to cause said sleeve partially to uncover said port when said stem is actuated in the direction to open said seat opening, and mechanical means to cause said sleeve to cover said port when said stem is actuated in the direction to close said seat opening.

4. In a push valve, a casing having therein outer and inner chambers communicating through a port, said outer chamber having an inlet and said inner chamber a discharge opening, a valve seat in said inner chamber between said port and said opening, a stem extending through and smaller than the seat opening, adapted to be operated from outside of said casing, and provided on opposite sides of said seat with a shouldered valve and a closing flange, the former being adjacent to said port and the latter adjacent to said discharge opening, a projecting member on said stem behind said valve, and a sleeve slidingly mounted on said valve and adapted to cover and uncover said port, said sleeve having an interior flange between the shouldered part of said valve and said projecting member.

5. In a push valve, a casing having therein outer and inner chambers communicating with each other through a port, said outer chamber having an inlet and said inner chamber a discharge opening, a valve seat in said inner chamber between said port and said opening, a stem extending through and smaller than the seat opening, adapted to be operated from outside of said casing, and provided on opposite sides of said seat with a shouldered valve and a closing flange, the former being adjacent to said port and the latter adjacent to said discharge opening, a projecting member on said stem behind said valve, and a sleeve slidingly mounted on said valve and adapted to cover and uncover said port, said sleeve having an interior flange between the shouldered part of said valve and said projecting member, the maximum amount of travel permitted said sleeve flange by said shoulder and said projecting member being less than the maximum travel permitted said valve, whereby said sleeve is actuated by said valve partially to uncover said port, and by the flow through said port completely to uncover the same, and is actuated by said projecting member completely to cover said port.

6. In a push valve, a casing having therein outer and inner chambers communicating with each other through a port, said outer chamber having an inlet, said inner chamber having a discharge opening, and being provided with a shoulder between said port and said opening, a valve-seat member in said inner chamber against said shoulder, retaining means in said inner chamber for said member, a stem passing through said member and of less diameter than the diameter of the seat opening therein, extending through said retaining means to the outside, and provided with a closing flange adjacent to said discharge opening, a valve for said valve seat mounted on and secured to said stem behind said seat, and a sliding valve sleeve on said valve for said port.

7. In a push valve, a casing having therein outer and inner chambers communicating with each other through a port, said outer chamber having an inlet, and said inner chamber a discharge opening, and being provided with a shoulder between said port and said opening, a valve-seat member in said inner chamber against said shoulder, a retaining nut at the outer end of said inner chamber, packing and retaining members between said nut and said member, a stem slidingly arranged in said nut and in said packing and retaining members, and having thereon a closing flange adjacent to said discharge opening, a push button mounted on the outer end of said stem, a valve for the seat in said member mounted on and secured to said stem, and a valve sleeve slidingly mounted on said valve in operative position relative to said port, said stem extending through and being smaller than the seat opening.

8. In a push valve, a casing having therein outer and inner chambers communicating with each other through a port, said outer chamber having an inlet, and said inner chamber having a discharge opening, and being provided with a shoulder between said port and said opening, a valve-seat member in said inner chamber against said shoulder, a retaining nut at the outer end of said inner chamber, packing and retaining members between said nut and said member, one of said retaining members being hollow and perforated adjacent to said opening, a stem slidingly arranged in said nut and in said packing and retaining members extending through and smaller than the valve-seat opening in said member, and having a closing flange in said perforated retaining member, and a push button at the outer end, a valve mounted on and secured to said stem in operative position to said valve-seat opening, and a valve sleeve slidingly mounted on said valve in operative position relative to said port.

9. A push valve comprising a casing having therein outer and inner horizontal chambers which communicate with each other through a port, said outer chamber having an inlet and said inner chamber a discharge opening, and said casing also having therein an outer vertical chamber open at the top and having an outlet at the bottom, a valve seat in said inner chamber between said port and said opening, a stem having thereon intermediate of its ends and adjacent said discharge opening a closing flange, and adapted to be actuated from outside of said casing, a valve for said seat mounted on said stem, and a valve sleeve for said port slidably mounted on said valve, said stem extending through and being smaller than the seat opening.

10. The combination, in a push valve, with a casing having therein outer and inner chambers which communicate with each other through a port, said outer chamber having an inlet and said inner chamber an outlet, and being provided with a shoulder between said port and outlet, of a stem having intermediate of its ends a closing flange, a valve-seat member, a valve with a valve sleeve slidably mounted thereon and a nut all receivable on said stem on one side of said flange, and a hollow recessed retainer, packings and a retaining nut all receivable on said stem on the other side of said flange, these parts and members on the stem being receivable in said inner chamber, with said valve-seat member against said shoulder and said nut at the outer end of the inner chamber.

FRANK A. BICKNELL.